United States Patent [19]

Kubo

[11] Patent Number: 4,787,363

[45] Date of Patent: Nov. 29, 1988

[54] WIRE SAWING METHOD FOR REINFORCED CONCRETE STRUCTURES

[75] Inventor: Setsuo Kubo, Kyoto, Japan

[73] Assignee: Kabushiki Kaisha Dymosha, Japan

[21] Appl. No.: 78,883

[22] Filed: Jul. 29, 1987

[30] Foreign Application Priority Data

Jan. 31, 1987 [JP]   Japan ................................. 62-21241

[51] Int. Cl.⁴ .............................................. B28D 1/08
[52] U.S. Cl. ........................................ 125/21; 299/35
[58] Field of Search ...................... 125/21, 12; 299/35, 299/63; 83/651.1

[56] References Cited

U.S. PATENT DOCUMENTS

| | | | |
|---|---|---|---|
| 594,542 | 11/1897 | Knobel | 299/35 |
| 753,092 | 2/1904 | Neukirch | 299/35 |
| 2,150,381 | 3/1939 | Lansing | 125/21 |
| 2,674,238 | 4/1954 | Dessureau et al. | 125/21 |
| 3,599,623 | 8/1971 | Phy | 125/21 |
| 4,633,848 | 1/1987 | Bresciahi | 125/21 |

FOREIGN PATENT DOCUMENTS 0562310  11/1923  France ................................... 125/21

Primary Examiner—Frederick R. Schmidt
Assistant Examiner—Shirish Desai
Attorney, Agent, or Firm—Franklin D. Wolffe; Morris Fidelman

[57] ABSTRACT

A wire sawing method for cutting buildings, dams, bridge piers, foundations and other reinforced concrete structures is exhibited.

This method is characterized by laying a cable on a reinforced concrete structure and using a moving type cable driving machine which pulls the cable for cutting and drives it circularly while the machine itself moves, together in series with a fixed type cable driving machine which drives the tension side part of the cable for cutting. The endless cable for cutting is circularly driven while its running speed and tension are adjusted by the cable driving system.

4 Claims, 1 Drawing Sheet

WIRE SAWING METHOD FOR REINFORCED CONCRETE STRUCTURES

BACKGROUND OF THE INVENTION

1. Field of the Invention

This invention is concerned with the wire sawing method for such reinforced concrete structures as buildings, dams, bridge piers, foundations and others.

2. Description of the Prior Art

Conventionally, disk blade type cutting machines equipped with circumferential blades have been widely used for cutting reinforced concrete structures. However, these cutting machines have the disadvantage that, due to various circumstance of the manufacture of blades, workability, handling and the like, the adoption of the method to large size operations is impossible. Therefore, the cutting capacity of these machines is poor, the cross-sectional area to be cut is limited to a narrow range, and also the potential depth of cut is limited to about 30-40 cm at maximum.

In addition, when submerged reinforced concrete structures are cut using disk blade type cutters, the cutters must be operated by underwater drives and it is a large burden on the workers. In addition, there are the problems such that the work efficiency is low and the diving works for long hours are dangerous. Moreover, these problems become more serious as the water depth increases.

Thereupon, this inventor has previously developed a wire sawing technique for reinforced concrete structures, in which an endless cable for cutting is laid on the reinforced concrete structures and circularly run while the running speed and tension are adjusted by a cable driving machine.

In this case, beads having a diamond abrasive layer on their surfaces are arranged on a wire rope composed of steel strands at a suitable pitch, with or without coil spring spacers, to form the cutting cable. The running speed of a cable for cutting in ordinary wire sawing is about 15-30 m/s, the tension of the stretched cable is about 50-150 kg, and the length of the cable for cutting varies according to the size of the place to be cut in reinforced concrete structures and the relative positions of the place to be cut, but usually it is about 10-60 m.

In this wire sawing technique for use in underwater cutting of reinforced concrete structures, for which safe and efficient cutting work has been regarded a difficult in the past, as well as the ordinary cutting of reinforced concrete structures on the ground, the cutting operation, even of internal reinforcing bars, can be carried out without being restricted by the crosssectional area to be cut, the depth of cut and so on, at an extremely fast cutting speed, with good workability and safely. In addition, the cutting operation is conducted in such a way that the effect to the external environment due to vibration and noise is very small.

However, in the above previous wire sawing technique, in the case of underwater cutting, the cable is subjected to large viscous resistance and form drag through the water. Consequently, there is a problem that the cutting force of the running cable is reduced. The required power output of a cable driving machine in ordinary wire sawing technique was about 37-52 hp. But in the case of underwater cutting, a greater power output was required, if possible, 80-100 hp.

Further, with the cutting force of the running cable reduced, there was a problem that in the slackening portion of the cable (the side leaving the cable diving machine) particularly when accompanied by irregular wave motion of the water, and at the same time, irregular intermittent motion in the movement of the cable driving machine, wire sawing was inconsistent.

In order to solve the above various problems, the power output of the cable driving machine was increased to the required level, for example, by mounting a large prime mover of 80-100 hp on the cable driving machine, the total weight of the installation exceeds 1 ton, and probably becomes about 1.3-1.5 tons. Accordingly, another problem arises in that the transportation, lifting and lowering, installation, movement and all other workings of the machine is more difficult. Because mobility is required in order to cut or partially dismantle various reinforced concrete structures by wire sawing, the increase of the weight and size of the cable driving machines is not desirable.

The objective of this invention is to provide a wire sawing method for reinforced concrete structures, which facilitates easier transportation, lifting and lowering of the cable driving machine and which can ensure sufficient driving power for the running cable, not only while cutting on the ground, but also while cutting reinforced concrete structures underwater.

SUMMARY OF THE INVENTION

The above objective is attained by this invention. The wire sawing method for reinforced concrete structures by this invention is characterized by laying a cable for cutting on reinforced concrete structures and using a moving type cable driving machine which pulls the cable for cutting and drives it in a circular motion while moving together with a fixed type cable driving machines which drives a part on the tension side of the cable for cutting in a fixed state, the fixed machine and the moving machine being operable in series as a cable driving system. Thus, the cable for cutting is run in circulation in an endless state while the running speed and tension are adjusted by the cable driving system.

In the above system, a moving type cable driving machine comprises, for example, a cable driving pulley that circularly runs a cutting cable as a part of its loop winds around the pulley, a tension side tension pulley and a slackening side tension pulley for adjusting the angle of contact if necessary, a rotary driving mechanism for rotating the cable driving pulley, and a moving mechanism for the whole machine. The moving mechanism included, for example, that which can move on a track being laid beforehand with driving wheels and their corresponding rotary driving mechanism, that which can move on a rack laid beforehand for engaging a driving pinion and its corresponding rotary driving mechanism, and the like.

The fixed type cable driving machine comprises, for example, an auxiliary cable driving pulley which drives the portion of the tension side of the cable winding around it, a forward tension pulley and a backward tension pulley for adjusting the angle of contact, a rotary driving mechanism for rotating the auxiliary cable driving pulley. Wheels may be provided so that the fixed machine can be moved conveniently between jobs, if necessary. Further, several fixed type cable driving machines like this may be installed in series, if needed.

The respective rotary driving mechanisms for the cable driving pulley of a moving type cable driving machine and the auxiliary cable driving pulley of a fixed type cable driving machine desribed above, are preferably prime movers, because it is not necessary to receive electric power or oil pressure from separate energy sources, such as electric oil pressure generating apparatuses. Thus, they can be used immediately in all work sites and are more manageable. Of course, if an electric source or oil pressure source is readily available, relatively light weight electric motors or hydraulic motors may be used.

In the case of underwater cutting, when the cable driving machines are installed in water, it is desirable to use an oil pressure mechanism since the rotary driving mechanism is waterproof and air tight. Oil pressure may be supplied to submerged hydraulic motors from an oil pressure generator installed on the ground. For the driving power of the moving mechanism of the moving type cable driving machine, a part of the driving power of the rotary driving mechanism of the cable driving pulley may be utilized.

In the above system, when the moving type cable driving machine is operated, the endess cable runs circularly while being pulled, thus cutting the reinforced concrete structure. As described above, when the fixed type cable driving machine is operated simultaneously with the operation of the moving type cable driving machine, sufficient driving power is provided to the cable for effective cutting. Thus, underwater wire sawing may be carried out at the same cutting speed as above ground cutting, and just as stably. Of course, the wire sawing technique described above can also be applied to ordinary above ground cutting, as the occasion arises.

In the above system, the cable can be arranged between the moving type cable driving machine, the fixed type cable driving machine and the reinforced concrete structure in any desired configuration, by installing freely rotating guide pulleys at respective places of curve, as needed.

As mentioned above, the wire sawing technique for reinforced concrete structures of this invention, does not require a cable driving machine having a large power output or large weight to ensure sufficient driving power. Instead, a moving type cable driving machine and a fixed type cable driving machine are used together in series, therefore, ease of workability in the transportation, lifting and lowering of cable driving machines is facilitated. In addition, when the cable is subjected to large viscous resistance and during underwater cutting, sufficient driving power for running the cable and stable wire sawing can be ensured.

DESCRIPTION OF THE PREFERRED EMBODIMENT OF THE INVENTION

Figure 1:
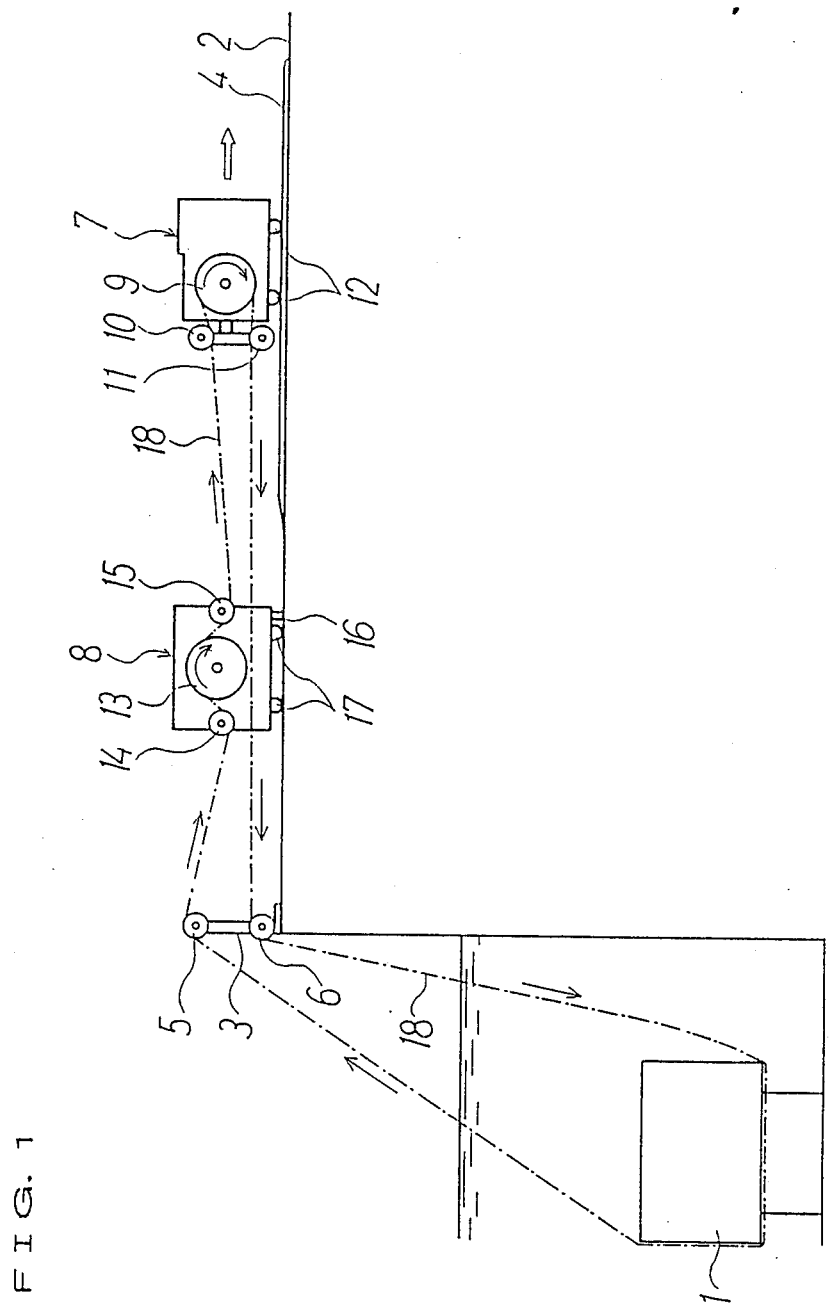
FIG. 1 is the front view of a preferred embodiment of the wire sawing method for reinforced concrete structures of this invention.

In FIG. 1, there is a horizontal reinforced concrete structure 1 to be dismantled by cutting underwater. On a road 2 on a quay in front of it, a guide pulley stand 3 and a track 4 adjacent to it are installed with anchors so as to be removable. The guide pulley stand 3 is equipped with a pair of longitudinal guide pulleys 5 and 6 arranged up and down.

On the track 4, a moving type cable driving machine 7 is placed so as to be movable and close to the guide pulley stand 3, a fixed type cable driving machine 8 is installed so that it can be moved or fixed as occassion demands.

The moving type cable driving machine 7 is equipped with a cable driving pulley 9, a tension side tension pulley 10 and a slackening side tension pulley 11 before and adjacent to it, a rotary driving mechanism for the cable driving pulley 9 (the illustration is omitted), the driving wheels 12 rolling on the track 4 and its rotary driving mechanism (the illustration is omitted). The fixed type cable driving machine 8 is equipped with an auxiliary cable driving pulley 13, a forward tension pulley 14 and backward tension pulley 15 adjoining before and after it, a rotary driving mechanism for the auxiliary cable driving pulley 13 (the illustration is omitted), and wheels for movement 17 that are held stationary through the use of a brake 16 after installation.

A portion of the cable 18 is wound around the bottom and side of the reinforced concrete structure 1, the tension side part of the cable is successively laid on the upper longitudinal guide pulley 5 on the guide pulley stand 3, the forward tension pulley 14, the auxiliary cable driving pulley 13 and the backward tension pulley 15 of the fixed type cable driving machine 8, and the tension side tension pulley 10 in the moving type cable driving machine 7. Further on the other side, the cable is wound around the cable driving pulley 9 of the moving type cable driving machine 7, and subsequently, its slackening side part is laid on the slackening side tension pulley 11 in the moving type cable driving machine 7 and the lower longitudinal guide pulley 6 on the guide pulley stand 3, in this way, the cable for cutting 18 is arranged in an endless state.

In the above system, the tension side tension pulley 10 and the slackening side tension pulley 11 adjust the angle of contact of the cable 18 with the cable driving pulley 9, and similarly, the forward tension pulley 14 and the backward tension pulley 15 adjust the angle of contact of the cable 18 with the auxiliary cable driving pulley 13.

In the above construction, when the respective rotary driving mechanisms for the cable driving pulley 9 and the driving wheels 12 of the moving type cable driving machine 7 are operated, the cable driving pulley 9 moves along the track 4 while rotating in the direction of white arrow in the drawing. Accordingly, the endless cable 18 runs circularly in the direction of the arrows. At the same time, the reinforced concrete structure 1 in water is gradually cut from the bottom upward. In addition, when the rotary driving mechanism for the auxiliary cable driving pulley 13 of the fixed type cable driving machine 8 is operated simultaneously, the combines power outputs of the moving type cable driving machine 7 and the fixed type cable driving machine 8 pull the tension side of the cable 18 further, consequently, the driving power increases and sufficient and stable wire sawing becomes feasible.

As the embodiment of this invention may be made in many widely different ways without deviating from its fundamentals and scope, it is evident that the invention is not limited to its specific embodiment except those defined in the appended claims.

I claim:

1. A wire sawing method for cutting reinforced concrete structures comprising:
    reeving an endless cutting cable around the concrete structure to be cut and through the pulleys of a cable driving system, said cable driving system including a movable cable driving machine and a fixed cable driving machine arranged in series to circularly drive said endless cable;

pulling said cable with said movable cable driving machine;

driving the tension side of said cable with said fixed cable driving machine, said movable cable driving machine and said fixed cable driving machine cooperating so as to adjust the speed and tension of said endless cable.

2. A wire sawing method as in claim 1, wherein said movable cable driving machine is movable along a track.

3. A wire sawing method as in claim 1, further comprising adjusting the angle of contact between said endless cable and said movable cable driving machine through a tension side tension pulley and a slackening side tension pulley.

4. A wire sawing method as in claim 1, further comprising adjusting the angle of contact between said endless cable and said fixed cable driving machine through a forward tension pulley and a backward tension pulley.

* * * * *